(12) United States Patent
Vezzani

(10) Patent No.: US 10,676,540 B2
(45) Date of Patent: Jun. 9, 2020

(54) PROCESS FOR THE PRODUCTION OF THERMALLY MODIFIED STARCH

(71) Applicant: Ambiente E Nutrizione S.R.L., Rozzano (Mi) (IT)

(72) Inventor: Massimo Vezzani, Rozzano (IT)

(73) Assignee: Ambiente E Nutrizione S.R.L., Rozzano (Mi) (IT)

(*) Notice: Subject to any disclaimer, the term of this patent is extended or adjusted under 35 U.S.C. 154(b) by 0 days.

(21) Appl. No.: 16/020,124

(22) Filed: Jun. 27, 2018

(65) Prior Publication Data
US 2019/0002593 A1  Jan. 3, 2019

(30) Foreign Application Priority Data
Jun. 29, 2017 (IT) .................. 102017000073160

(51) Int. Cl.
  *C08B 30/12* (2006.01)
  *B01J 19/18* (2006.01)
  *C08B 30/14* (2006.01)

(52) U.S. Cl.
  CPC .......... *C08B 30/12* (2013.01); *B01J 19/1812* (2013.01); *C08B 30/14* (2013.01); *B01J 2204/005* (2013.01); *B01J 2208/00752* (2013.01); *B01J 2208/065* (2013.01); *B01J 2219/00033* (2013.01); *B01J 2219/00085* (2013.01)

(58) Field of Classification Search
None
See application file for complete search history.

(56) References Cited

U.S. PATENT DOCUMENTS

| | | | | |
|---|---|---|---|---|
| 5,830,884 A * | 11/1998 | Kasica | ................. | A61K 9/0019 514/160 |
| 5,989,350 A * | 11/1999 | Fischer | ................... | C08B 30/12 106/215.3 |
| 9,688,778 B2 * | 6/2017 | Essers | ..................... | C08B 30/12 |

FOREIGN PATENT DOCUMENTS

| | | | | |
|---|---|---|---|---|
| CN | 106540947 A | 3/2017 | | |
| EP | 0710670 A1 * | 5/1996 | ............. | C08B 30/16 |
| EP | 0710670 A1 | 5/1996 | | |
| EP | 1813604 A1 | 8/2007 | | |
| FR | 3041275 A3 | 3/2017 | | |
| WO | 2006105957 A1 | 10/2006 | | |
| WO | 2014158022 A1 | 10/2014 | | |
| WO | WO-2014158022 A1 * | 10/2014 | ............. | C08B 30/16 |
| WO | 2016156009 A1 | 10/2016 | | |
| WO | WO-2016156009 A1 * | 10/2016 | .......... | B01J 19/1812 |

OTHER PUBLICATIONS

Search Report of IT 201700073160 dated Dec. 14, 2017.
Written Opinion of IT201700073160 dated Dec. 14, 2017.

* cited by examiner

*Primary Examiner* — Stefanie J Cohen
(74) *Attorney, Agent, or Firm* — Silvia Salvadori, P.C.; Silvia Salvadori

(57) ABSTRACT

Process for the production of thermally modified starch comprising the steps of mixing starch in powder form having a specific moisture content with an alkaline water solution to obtain a wet powder; feeding a continuous flow of said wet powder into a continuous dryer together with a continuous flow of hot air; discharging a continuous flow of dried powder from said continuous drier; supplying said continuous flow of said dried powder into a turbo-reactor, in which the inner wall of said turbo-reactor is maintained at a specific temperature; converting said dried powder into a thermally inhibited starch; and discharging said thermally inhibited starch from said turbo-reactor; it is also disclosed a thermally inhibited starch obtained from the aforementioned process with enhanced physical chemical properties.

9 Claims, 1 Drawing Sheet

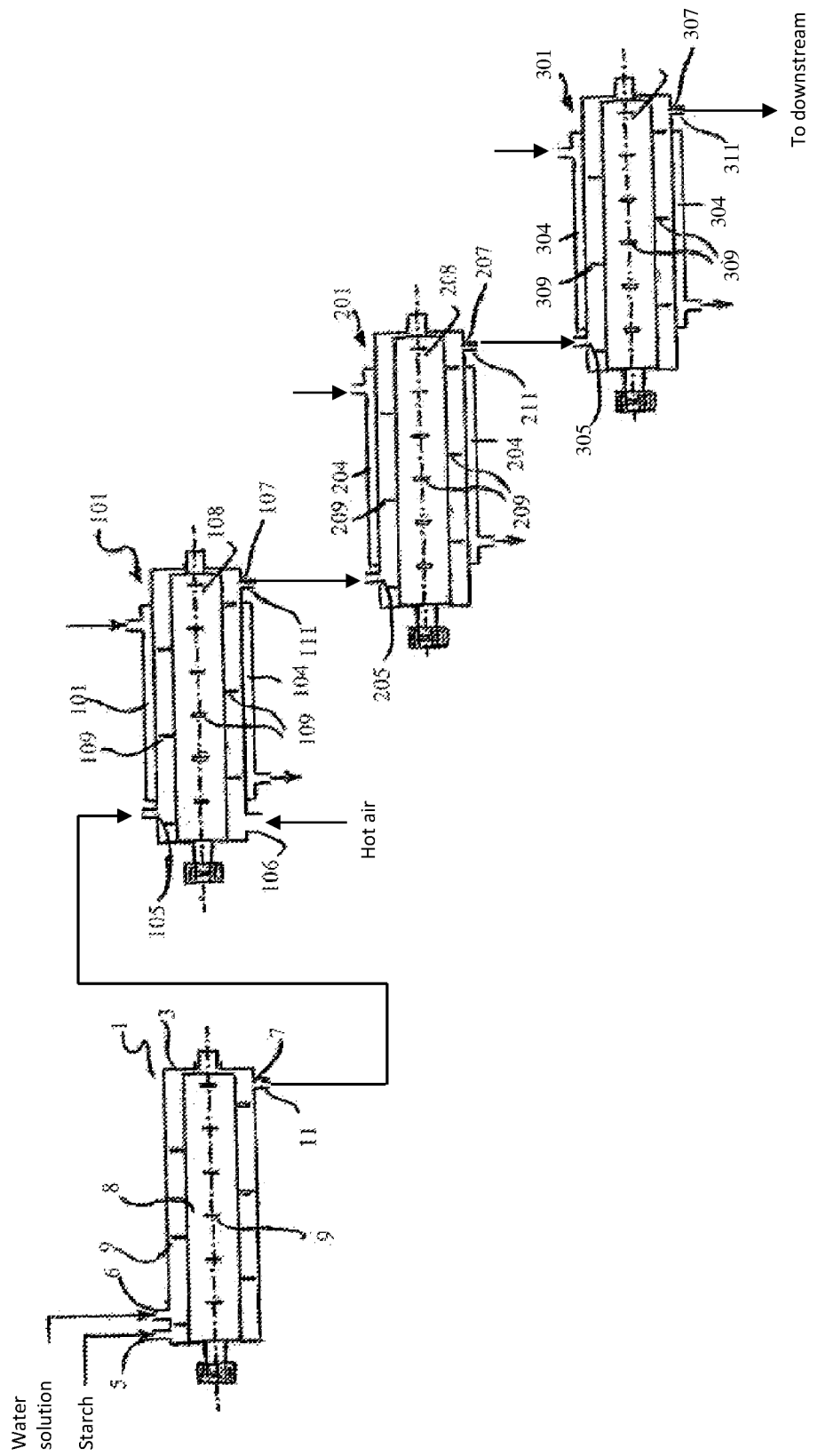

PROCESS FOR THE PRODUCTION OF THERMALLY MODIFIED STARCH

This application claims priority to and the benefit of Italian Patent Application No. 102017000073160 filed on Jun. 29, 2017, the content of which is incorporated herein by reference in its entirety.

FIELD OF THE APPLICATION

The present invention relates to the production of thermally modified starch. In particular, the invention relates to a process for the production of thermally modified starch comprising a step of treatment at a high temperature, carried out in a turbo-reactor.

PRIOR ART

Starch is widely required and used in the food industry as gel former, thickening agent, and stabilizing agent, for example as colloidal emulsifier.

The properties required for a particular application, availability of the starch and its cost play a role in selecting a particular native starch for subsequent chemical and/or physical modification.

Normal maize, waxy maize, high-amylose maize, tapioca, potato and wheat starch are the most available and less expensive starches, but varieties of rice, including waxy rice, pea, oat, barley, rye, amaranth, sweet potato and certain other exotic plant varieties (whose stem, leaves, fruits or seeds are rich in starch) can be used as local commercial sources.

In general, native starches produce weak-bodied, cohesive, rubbery pastes when heated and undesirable gels when mixtures comprising them are cooled.

For these reasons, food manufacturers usually require starches having improved characteristics with respect to those provided by native starches.

Chemical modification of starch generally involves esterification, etherification or oxidation of the available hydroxyl groups on the β-D-glucopyranosyl units which form starch polymers.

Many commercial derivatives are produced by the addition of reactive organic reagents to aqueous starch slurries while controlling alkalinity (pH 7-9 for esterification and pH 11-12 for etherification) and temperature (typically higher than 60° C.). Hydroxypropyl starches prepared by etherification with propylene oxide and starch acetates prepared by esterification with acetic anhydride are commonly used in food applications. Enhanced stability is achieved by using an all-amylopectin starch, e.g. waxy maize starch. Hydroxypropylation is more effective than acetylation in imparting low temperature stability.

In food applications, these modifications can be combined with cross-linking treatments to provide a range of products with numerous properties.

Likewise, modified starch polymers by chemical cross-linking only, such as phosphate cross-linking, can have required specific properties, such as acid and shear tolerance and heat resistance.

However, consumers are increasingly looking for food products which are substantially free of chemically modified ingredients, in spite of the safeness of the chemically modified starch products.

Moreover, differently from chemically modified starch, naturally occurring starch (which comprises the so-called "resistant starch") can provide several nutritional and/or physiological benefits, such as lowering of glucose and of cholesterol concentrations in blood, and reduction of the incidence of colon cancer.

As described in patent application WO 2014/158022, such non-chemically-modified starches can be obtained by mixing starch with an organic solvent, for example a methanol or ethanol solution, adjusting the pH to an alkaline value by adding a predetermined amount of alkali, and then heating the thus obtained mixture to a temperature between 120° C. and 190° C.

However, the organic solvent plays an active role in the overall modification process.

Therefore, not only the above process involves the use of organic solvents at high temperature, which is undesirable for toxicity and safety reasons, but also the modified starch obtained in this way can contain residual compounds which are usually not allowed in food processing, such as strong bases like sodium hydroxide, which is precisely the preferred base used in the process according to WO 2014/158022.

Differently, U.S. Pat. No. 8,725,676 discloses a process for producing thermally inhibited starch, comprising a dehydrating step, providing a substantially anhydrous or anhydrous starch, followed by a heat treating step of such a dehydrated starch at a temperature equal or above 100° C.

However, although in this case the use of organic solvent or of other potentially toxic compounds seems to be avoided, both the aforementioned dehydrating step and heat treating step are carried out for very long times. In particular, the heat treating step is carried out for a time between 1 and 20 hours, preferably between 3.5 and 4.5 hours at 160° C., which is unlikely to be feasible in accordance with the requirements of a competitive industrial process, especially of a continuous process.

In the light of the aforementioned drawbacks, the problem underlying the present invention is that of providing a continuous process for the production of a modified starch, in particular a thermally inhibited starch, which can be carried out more efficiently from an industrial point of view (less time-consuming and/or energy intensive) with respect to the ones according to the prior art, wherein such a modified starch is suitable for being used as an emulsifier and/or a rheological or thickening agent in food industry, and which is unexceptionable on health grounds.

SUMMARY OF THE INVENTION

The aforementioned problem has been solved by providing a process for continuous modification of starch, which comprises the steps of:

a) mixing starch in powder form having a moisture content between 9% and 25% with an alkaline water solution to obtain a wet powder;

b) feeding a continuous flow of said wet powder into a continuous dryer together with a continuous flow of hot air, wherein said flow of hot air has a temperature between 100° C. and 160° C.;

c) discharging a continuous flow of dried powder from said continuous drier, said dried powder having a moisture content between 2% and 4%, preferably between 2.5% and 3%;

d) providing a turbo-reactor comprising a cylindrical tubular body having at least one inlet opening for the introduction a said continuous flow of dried powder and at least one discharge opening, a heating jacket for bringing the temperature of said tubular body to a predetermined temperature and a rotor, disposed in the cylindrical tubular body and comprising a shaft provided with elements projecting radially from it;

e) supplying said continuous flow of said dried powder into said turbo-reactor, in which the inner wall of said turbo-reactor is maintained at a temperature between 150° C. and 250° C., preferably between 180° C. and 230° C., by means of the aforementioned heating jacket and the rotor being rotated at a speed greater than or equal to 800 rpm, so that said dried powder is continuously centrifuged and advanced inside said turbo-reactor through the action of said rotor for a time between 4 minutes and 7 minutes, preferably between 5 minutes and 6 minutes, and converted into a thermally inhibited starch;

f) discharging said thermally inhibited starch from said turbo-reactor.

Preferably, the aforementioned step e) is carried out maintaining said dried powder at a pH between 8.5 and 9.5.

According to an equally preferred manner, the heating jacket of the turbo-reactor of step d) is generally intended to be passed through by a heating fluid, such as diathermic oil or steam.

More preferably, the aforementioned elements projecting radially from the shaft of the rotor of the turbo-reactor of step d) may be for example rod-like or in the form of blades, V-blades or beaters.

Preferably, in the aforementioned mixing step a) said wet powder has a pH between 8.5 and 9.5.

According to a preferred embodiment of the present invention, the aforementioned mixing step a) can be carried out by means of a continuous mixer.

Preferably, according to the last preferred embodiment, the aforementioned mixing step a) is carried out for a time between 15 seconds and 120 second, even more preferably for a time between 20 seconds and 45 seconds.

Preferably, the aforementioned step b) is carried out maintaining said wet powder at a pH between 8.5 and 9.5.

According to an equally preferred embodiment of the present invention, in the aforementioned step b) the continuous flow of said wet powder is continuously fed to a turbo-dryer comprising a cylindrical tubular body having at least one inlet opening for the introduction of said wet powder, an air-inlet opening for the introduction of said continuous flow of hot air and at least one discharge opening for discharging said continuous flow of dried powder, a heating jacket for bringing the temperature of said tubular body to a predetermined temperature and a rotor, disposed in the cylindrical tubular body and comprising a shaft provided with elements projecting radially from it, in which the inner wall of the turbo-dryer is maintained at a temperature between 150° C. and 180° C., preferably between 160° C. and 170° C., by means of said heating jacket and the rotor being rotated at a speed greater than or equal to 800 rpm; and said continuous flow of wet powder is continuously centrifuged and advanced inside said turbo-dryer through the action of said rotor.

Preferably, according to the last preferred embodiment, the aforementioned step b) is carried out for a time between 15 seconds and 120 second, more preferably for a time between 20 seconds and 45 seconds.

Preferably, the heating jacket of the turbo-dryer of step b) is generally intended to be passed through by a heating fluid, such as diathermic oil or steam.

More preferably, the aforementioned elements projecting radially from the shaft of the rotor of the turbo-dryer of step b) may be for example rod-like or in the form of blades, V-blades or beaters.

According to a preferred embodiment of the present invention, the above process further comprises steps of:

g) supplying a continuous flow of said thermally inhibited starch into a further turbo-reactor which comprises a cylindrical tubular body having at least one inlet opening for the introduction of said thermally inhibited starch and at least one discharge opening, a heating jacket for bringing the temperature of said tubular body to a predetermined temperature and a rotor, disposed in the cylindrical tubular body and comprising a shaft provided with elements projecting radially from it, in which the inner wall of the further turbo-reactor is maintained at a temperature between 150° C. and 250° C., preferably between 180° C. and 230° C., by means of said heating jacket and the rotor is rotated at a speed greater than or equal to 800 rpm, said thermally inhibited starch being continuously centrifuged and advanced inside the aforementioned further turbo-reactor through the action of said rotor, in order to further enhance starch thermal inhibition;

h) discharging said thermally inhibited starch from said further turbo-reactor.

Preferably, the heating jacket of the further turbo-reactor of step g) is generally intended to be passed through by a heating fluid, such as diathermic oil or steam.

More preferably, the aforementioned elements projecting radially from the shaft of the rotor of the further turbo-reactor of step g) may be for example rod-like or in the form of blades, V-blades or beaters.

In general, the aforementioned alkaline water solution can comprise a base having a pKb between 1 and 13, more preferably between 2.5 and 4.5.

Said base can advantageously be a food grade additive, so as to achieve a significant advantage with regard to the possible application of the so-obtained thermally inhibited starch, and it can, preferably be selected from the group consisting of dibasic oxalate metal salt, dibasic tartrate metal salt, tribasic citrate metal salt, tribasic phosphate metal salt, monobasic carbonate metal salt, dibasic carbonate metal salt, glycinate metal salt, calcium hydroxide and any combination thereof.

Indeed, the process according to the present invention is particularly suitable to be carried out for the obtainment of a product, namely a thermally inhibited starch, which can be directly used in the food industry without any mandatory further purification or separation treatment.

In addition, the process according to the present invention, carried out continuously by means of a specific sequence of steps, is advantageously carried out by avoiding the use of toxic and/or potentially dangerous-to-manipulate organic solvents.

Moreover, the process for continuous modification of starch according to the present invention does not require any preliminary gelatinization step of the starting organic substrate (native starch), with a consequent marked reduction in the production times and costs.

Furthermore, according to a preferred embodiment of the above process, wherein step e) is carried out by means of the aforementioned turbo-reactor, the intense mechanical action exerted by the rotor of the turbo-reactor is such that a significant quantity of kinetic energy is transmitted to the substrate: such an ongoing transmission of kinetic energy to the substrate causes an intimate interaction between the dextrinized starch chains, which have been obtained as a consequence of the preceding steps of the process, and the starch chains which have not been dextrinized yet.

This intimate interaction is deemed to influence the formation of new so called "cross-linked" starch polymers, which are to be meant as starch polymers having a higher branching degree if compared to the aforementioned (native) starch.

Advantageously, corroborated by the creation of a dynamic, thin, tubular layer of starch flowing inside said turbo reactor, such an intimate interaction requires few minutes, generally not more than 12 minutes, preferably not more than 6 minutes, in order to be effective: processing times having this order of magnitude are particularly indicated for a continuous industrial application.

Accordingly, when the aforementioned step b) is carried out by means of a turbo-drier, the process according to the present invention is undoubtedly fast and even more feasible for a continuous industrial application if compared with the ones according to the prior art.

Then, owing to the heating jacket of the turbo-dryer, of the turbo-reactor, and of the further turbo-reactor, used in the aforementioned steps b), e), and g), respectively, it is possible to precisely control the temperature inside the turbo-dryer, inside the turbo-reactor and inside said further turbo-reactor, respectively, so that it remains in the region of the optimum temperature value for the respective mixing step, involving a specific chemical and/or physical transformation.

According to another aspect, the present invention relates to a plant for carrying out the process for continuous modification of starch according to the present invention, which comprises:

a turbo-dryer comprising a cylindrical tubular body having at least one inlet opening for the introduction of a continuous flow of wet powder comprising starch in powder form and an alkaline water solution, at least one air-inlet opening for the introduction of a flow of hot air and at least one discharge opening for discharging a continuous flow of dried powder, a heating jacket for bringing the temperature of said tubular body to a predetermined temperature and a rotor, disposed in said cylindrical tubular body and comprising a shaft provided with elements projecting radially from it; and, a turbo-reactor comprising a cylindrical tubular body having at least one inlet opening for the introduction of said continuous flow of dried powder, said at least one inlet opening of the cylindrical tubular body of the turbo-reactor being in fluid communication with said at least one discharge opening of the cylindrical tubular body of the turbo-dryer and at least one discharge opening for discharging a thermally inhibited starch, a heating jacket for bringing the temperature of said tubular body to a predetermined temperature and a rotor, disposed in the cylindrical tubular body and comprising a shaft provided with elements projecting radially from it.

Preferably, the plant can comprise a further turbo-reactor comprising a cylindrical tubular body having at least one inlet opening for the introduction of said thermally inhibited starch, said at least one inlet opening of the cylindrical tubular body of the further turbo-reactor being in fluid communication with said at least one discharge opening of said cylindrical tubular body of said a turbo-reactor, and at least one discharge opening, a heating jacket for bringing the temperature of said tubular body to a predetermined temperature and a rotor, disposed in the cylindrical tubular body and comprising a shaft provided with elements projecting radially from it.

More preferably, the plant can further comprise a continuous mixer comprising a cylindrical tubular body having at least one inlet opening for the introduction of a continuous flow of said starch in powder form and at least one inlet opening for the introduction of an alkaline water solution and at least one discharge opening for discharging a continuous flow of said wet powder, and a rotor, disposed in said cylindrical tubular body and comprising a shaft provided with elements projecting radially from it.

According to another aspect of the present invention, the aforementioned problem has been solved by a cross-linked thermally inhibited starch (clean-label starch) obtained from a the process according to the present invention, wherein said cross-linked thermally inhibited starch has a moisture content of less than or equal to 1% by weight, preferably comprised between 0.20% and 0.50% by weight, and a pasting temperature of less than 70° C., preferably less than 65° C., more preferably less than 60° C.

In particular, said pasting temperature is calculated by means of a Micro Visco-Amylo-Graph® device by making a 12% w/v aqueous mixture of the aforementioned thermally inhibited starch and, consequently, heating such a mixture with a rate of about 3° C./min.

Thus, the aforementioned cross-linked thermally inhibited starch obtained by means of a process according to the present invention, when mixed with water and then heated, advantageously allows to obtain a viscous mixture at relatively low temperature.

Moreover, as disclosed extensively in the following detailed description, the aforementioned cross-linked thermally inhibited starch allows to obtain viscous mixtures, whose viscosity does not substantially increase when heated at a temperature comprised between 80° C. and 100° C., kept at such a temperature for a time comprised between 25 minutes and 30 minutes, and then cooled to room temperature.

In particular, when said viscous mixture is heated at high temperature (temperature comprised between 80° C. and 100° C.), kept at such temperature for said time, and subsequently cooled to room temperature, the aforementioned cross-linked thermally inhibited starch obtained by means of the process according to the present invention allows to obtain a final mixture (for example, a food product) having a viscosity almost constant in the time (during its shelf-life).

Advantageously, one can change the properties of the thermally inhibited starch according to the present invention by properly setting the process parameters of the process according to the present invention from which it is obtained (for example, by setting the time and/or the speed of rotation of the rotor and/or the temperature during the aforementioned step e) of supplying the aforementioned dried powder to the aforementioned turbo-reactor).

For example, such properties can be the aforementioned pasting temperature, the turbidity, rather than the viscosity of the aforementioned final mixture (or of a final product) obtained by mixing a predetermined quantity of the starch according to the present invention with water, then heating and cooling to room temperature such a mixture.

According to another aspect of the present invention, the aforementioned problem has been solved by a use of the aforementioned thermally inhibited starch obtained from the process according to the present invention as a thickening agent and/or stabilizing agent, preferably in a food formulation.

In particular, the aforementioned thermally inhibited starch can be used as a thickening agent and/or stabilizing agent in a colloidal or in a dispersion formulation such as a table sauce, a soup, a beverage or a diary product.

The advantages and characteristic features of this invention will emerge more clearly from the detailed description, provided below as a non-limiting illustration of a preferred embodiment according to the present invention, with reference to the apparatus schematically shown in the attached FIGURE.

DETAILED DESCRIPTION OF A PREFERRED EMBODIMENT

With reference to the FIG. 1, an apparatus used for the process according to the invention comprises a continuous mixer M consisting essentially of a cylindrical tubular body 1, closed at the opposite ends by end plates 2, 3.

The tubular body 1 is provided with inlet openings 5, 6 respectively for the organic substrate (starch) and for the alkali aqueous solution, and with a discharge opening 7.

The tubular body 1 rotatably supports internally a rotor comprising a shaft 8 provided with elements 9 radially projecting therefrom in the form of blades, these blades 9 being arranged helically and oriented so as to centrifuge and at the same time convey towards the discharge outlet 7 a flow of wet powder resulting from mixing the aforementioned two flows.

A motor not shown is envisaged for operation of the bladed rotor at variable speeds, which can be greater than or equal to 800 rpm.

When it exits from the continuous mixer M, the aforementioned wet powder is continuously fed via a pipe 11, in fluid communication with the discharge opening 7 of the continuous mixer M, to the turbo-dryer D through the inlet opening 105.

The turbo-drier D consists essentially of a cylindrical tubular body 101, closed at the opposite ends by end plates 102, 103 and coaxially provided with a heating jacket 104 intended to be passed through by a fluid, for example diathermic oil, so as to keep the inner wall of the body 101 at a predefined temperature.

The tubular body 101 is provided with an inlet opening 105 for the introduction of the aforementioned wet powder discharged by the discharge opening 7 of the continuous mixer M. The inlet opening 105 of the tubular body 101 of the turbo-dryer D is in fluid communication with the discharge opening 7 by means of the pipe 11.

The tubular body 101 is provided with an air-inlet opening 106 for the introduction of a flow of hot air inside the tubular body 101 of the turbo-dryer D. The air-inlet opening 106 is in fluid communication with a conventional air-heating system which is not part of the plant according to the present invention and/or is in fluid communication with a conventional reservoir for the storage of hot air which is not part of the plant according to the present invention and/or is in fluid communication with the atmosphere.

The tubular body 101 is also provided with a discharge opening 107.

The tubular body 101 rotatably supports internally a rotor comprising a shaft 108 provided with elements 109 radially projecting therefrom in the form of blades, these blades 109 being arranged helically and oriented so as to centrifuge and at the same time convey towards the outlet 107 the flow of hot air and wet powder.

The wet powder entering the turbo-dryer D is centrifuged by the blades 109 of the rotor against the inner wall of the cylindrical tubular body 101, heated by means of the heating jacket 104 and by the aforementioned flow of hot air to a temperature between 150° C. and 180° C., preferably between 160° C. and 170° C.

The discharge opening 107 is used to discharge a continuous flow of hot air and water vapor, which can be released into the atmosphere or to a system for heat recovery, and a flow dried powder, resulting from drying of the aforementioned wet powder following the heat exchange of the latter with the wall of the turbo-dryer heated by the heating jacket 104 and with the flow of hot air.

Therefore, the continuous flow of dried powder discharged from the discharge opening 107 of the turbo-drier D is continuously fed, via a pipe 111, into the turbo-reactor T, through the inlet opening 205.

The turbo reactor T consists essentially of a cylindrical tubular body 201, closed at the opposite ends by end plates 202, 203 and coaxially provided with a heating jacket 204 intended to be passed through by a fluid, for example diathermic oil, so as to keep the inner wall of the body 201 at a predefined temperature.

The tubular body 201 is provided with at least one inlet opening 205 for the introduction of the aforementioned flow of dried powder discharged by the discharge opening 107 of the turbo-dryer D. The inlet opening 205 of the tubular body 201 of the turbo reactor T is in fluid communication with the discharge opening 107 by means of the pipe 111.

The tubular body 201 is also with a discharge opening 207.

The tubular body 201 rotatably supports internally a rotor comprising a shaft 208 provided with elements 209 radially projecting therefrom in the form of blades, these blades 209 being arranged helically and oriented so as to centrifuge and at the same time convey towards the outlet 207 the flow of material contacting them.

The wet powder entering the turbo-reactor T is centrifuged by the blades 209 of the rotor against the inner wall of the cylindrical tubular body 201, heated by means of the heating jacket 204 to a temperature comprised between 150° C. and 230° C.

The rotation of the shaft 208 of the bladed rotor at a speed at least greater than or equal to 800 rpm has the effect that a dynamic, thin, tubular layer of the aforementioned wet powder is created against the heated inner wall of the cylindrical tubular body 201 and an intense heat exchange takes place between the mixture and the aforementioned inner wall.

The resulting thermally inhibited starch is then continuously discharged from opening 207 of the turbo-reactor and then is continuously fed, via a pipe 211, into a continuous further turbo-reactor T', through the inlet opening 305.

The further turbo-reactor T', which has a structure entirely similar to that of the aforementioned turbo-reactor T, is not described in detail. The components of the further turbo-reactor T', which are the same as those of the turbo-reactor T', are indicated by the same reference numbers increased by 100.

Example 1

A flow of waxy corn starch in powder form with a moisture content of 13.77% was continuously fed (150 kg/h), through the inlet opening 5, into the continuous mixer M, inside which the bladed rotor 8 was rotated at a speed of 1000 rpm.

At the same time a flow of alkaline water solution, corresponding to about 6.4% w/w of sodium carbonate ($Na_2CO_3$), was continuously fed (12.8 kg/h) through the inlet opening 6.

Immediately at the inlet of the continuous mixer M, the flow of starch was mechanically dispersed into particles which were immediately centrifuged.

At the same time, the alkali water solution, fed through the inlet opening 6, was centrifuged by the blades of the rotor 8 in order to intimately mix it with the above flow of starch.

After an average residence time of about 30 seconds inside the reactor, a wet powder with a moisture content of about 19.6% was continuously discharged from the opening 7.

The wet powder thus obtained was continuously fed into the turbo-dryer D, through the inlet opening 105 with a flow rate of about 100 kg/h, in parallel with a flow of air at a temperature of about 143° C. (flow rate 285 $Nm^3/h$), fed through the air-inlet opening 106.

Inside the turbo-dryer D the wall temperature was kept at a value of 165° C., while the rotational speed of the bladed rotor 108 was kept constantly at 900 rpm.

After an average residence time of 30 seconds inside the turbo-dryer D, a flow of dried powder with a moisture content of 2.85% was continuously discharged from turbo-dryer D.

Then, this dried powder was continuously fed into turbo-reactor T, through the inlet opening 205, with a flow rate of 90 kg/h.

Inside the turbo reactor T the wall temperature was kept at a value of about 220° C., while the rotational speed of the bladed rotor 208 was kept constantly at 900 rpm.

At the inlet of the turbo-reactor T, the flow of dried powder was mechanically dispersed into particles which were immediately centrifuged against the inner wall of the reactor, where a dynamic, tubular, thin, fluid layer was formed.

After an average residence of 5 minutes and 30 seconds inside the turbo-reactor, a flow of thermally inhibited starch with a moisture content of less than 1% was continuously discharged from turbo-reactor T though the opening 207.

Then, such flow of thermally inhibited starch was continuously fed into the further turbo-reactor T', through the inlet opening 305, with a flow rate of 90 kg/h.

Inside the further turbo-reactor T' the wall temperature was kept at a value of about 220° C., while the rotational speed of the bladed rotor 308 was kept constantly at 900 rpm.

At the inlet of the further turbo-reactor T', the thermally inhibited starch was mechanically dispersed into particles which were immediately centrifuged against the inner wall of the reactor, where a dynamic, tubular, thin, fluid layer was formed.

After an average residence of 5 minutes and 30 seconds inside the further turbo-reactor, a flow of thermally inhibited starch, whose thermal inhibition was further enhanced and having a moisture content of less than 1%, was continuously discharged though the opening 307. The outlet temperature recorded in said flow of further thermally inhibited starch was 190° C. (starch t190).

The aforementioned flow of further thermally inhibited starch was then collected and cooled to room temperature.

Example 2

A flow of waxy corn starch in powder form with a moisture content of 13.77% was continuously fed (150 kg/h), through the inlet opening 5, into the continuous mixer M, inside which the bladed rotor 8 was rotated at a speed of 1000 rpm.

At the same time a flow of alkaline water solution, corresponding to about 6.4% w/w of sodium carbonate ($Na_2CO_3$), was continuously fed (12.8 kg/h) through the inlet opening 6.

Immediately at the inlet of the continuous mixer M, the flow of starch was mechanically dispersed into particles which were immediately centrifuged.

At the same time, the alkali water solution, fed through the inlet opening 6, was centrifuged by the blades of the rotor 8 in order to intimately mix it with the above flow of starch.

After an average residence time of about 30 seconds inside the reactor, a wet powder with a moisture content of about 19.6% was continuously discharged from the opening 7.

The wet powder thus obtained was continuously fed into the turbo-dryer D, through the inlet opening 105 with a flow rate of about 100 kg/h, in parallel with a flow of air at a temperature of about 143° C. (flow rate 285 $Nm^3/h$), fed through the air-inlet opening 106.

Inside the turbo-dryer D the wall temperature was kept at a value of 165° C., while the rotational speed of the bladed rotor 108 was kept constantly at 900 rpm.

After an average residence time of 30 seconds inside the turbo-dryer D, a flow of dried powder with a moisture content of 2.85% was continuously discharged from turbo-dryer D.

Then, this dried powder was continuously fed into turbo-reactor T, through the inlet opening 205, with a flow rate of 90 kg/h.

Inside the turbo reactor T the wall temperature was kept at a value of about 210° C., while the rotational speed of the bladed rotor 208 was kept constantly at 900 rpm.

At the inlet of the turbo-reactor T, the flow of dried powder was mechanically dispersed into particles which were immediately centrifuged against the inner wall of the reactor, where a dynamic, tubular, thin, fluid layer was formed.

After an average residence of 5 minutes and 30 seconds inside the turbo-reactor, a flow of thermally inhibited starch with a moisture content of less than 1% was continuously discharged from turbo-reactor T though the opening 207.

Then, such flow of thermally inhibited starch was continuously fed into the further turbo-reactor T', through the inlet opening 305, with a flow rate of 90 kg/h.

Inside the further turbo-reactor T' the wall temperature was kept at a value of about 210° C., while the rotational speed of the bladed rotor 308 was kept constantly at 900 rpm.

At the inlet of the further turbo-reactor T', the thermally inhibited starch was mechanically dispersed into particles which were immediately centrifuged against the inner wall of the reactor, where a dynamic, tubular, thin, fluid layer was formed.

After an average residence of 5 minutes and 30 seconds inside the further turbo-reactor, a flow of thermally inhibited starch, whose thermal inhibition was further enhanced and having a moisture content of less than 1%, was continuously discharged though the opening 307. The outlet temperature recorded in said flow of further thermally inhibited starch was 180° C. (starch t180).

The aforementioned flow of further thermally inhibited starch was then collected and cooled to room temperature.

Example 3 (Brabender Viscograph)

The thermally inhibited starch obtained from Example 1 (starch t190) and the inhibited starch obtained from Example 2 (starch t180) were then separately characterized by means of a Micro Visco-Amylo-Graph® for measuring their gelatinization properties and the viscosity values registered when mixed with water, heated to high temperature for a period of time, and the cooled to room temperature.

The following procedure was carried out for starch t190, for starch t180, and for a sample of waxy corn starch, which was not subjected to any inhibition process.

12 g or dry starch was mixed with 100 g of demineralized water in a Brabender cup and placed in the measuring equipment. The Brabender temperature was set at 30° C. and the stirring speed at 250 rpm.

The temperature was raised with a rate of about 3° C./min until 95° C. The mixture was kept at 95° C. for 30 min (so called "cooking period").

Then the mixture was cooled to 30° C. with a rate of about 3° C./min. After 1 minute at 30° C. the measurement was completed. The measuring was performed at 300 cmg.

Following Table 1 shows the gelatinization properties of each starch analyzed and the viscosity registered during Brabender viscography of each starch, respectively (UB=Brabender Units, which are arbitrary).

The pasting temperature is defined as the temperature at which the first detectable viscosity is measured by means of a Micro Visco-Amylo-Graph® machine.

The peak viscosity is defined as the highest value of viscosity attained by the mixture during the heating cycle.

The cold paste viscosity is defined as the viscosity attained as the mixture (cooked paste) is cooled down to 30° C.

The setback is defined as cold paste viscosity minus hot paste viscosity, wherein the hot paste viscosity is in its turn defined as the viscosity at the end of the cooking period (in the present case after having kept the mixture at 95° C. for 30 min).

TABLE 1

| Sample | Pasting temperature (° C.) | Peak viscosity (UB) | Cold paste viscosity (UB) | Setback (UB) |
|---|---|---|---|---|
| Waxy corn starch | 66.7 ± 0.3 | 1094 ± 1 | 843 ± 14 | 465 ± 3 |
| t190 starch | 59.8 ± 0.1 | 1526 ± 23 | 1090 ± 8 | 347 ± 21 |
| t180 starch | 63.4 ± 0.1 | 1277 ± 25 | 831 ± 40 | 386 ± 37 |

From Table 1 it is evident that with respect to waxy corn starch, t190 starch and t180 starch both have a pasting temperature lower than waxy corn starch, which is surprisingly considerably lower for t190 starch.

Starches with lower gelatinization temperature begin water adsorption and dissolution at a lower temperature and require shorter cooking time than those with higher gelatinization temperature, determining a more convenient and feasible applications, for example in formulation for the food industry.

Then, one can notice that t190 starch and t180 starch allows to obtain a more viscous paste at high temperature if comparing t190 starch and t180 starch peak viscosities with waxy corn starch peak viscosity. These results demonstrate that, in mixtures comprising t190 starch and t180 starch, starch grains swell good, which means that starch has a high water-holding capacity and it is easy to be cooked: the former property is related with a better final formulation product.

Then, Table 1 shows an excellent cold paste viscosity for t190 starch, which is dramatically higher than cold paste viscosity registered for waxy corn starch, and a good cold paste viscosity for t180 starch.

Finally, one can notice an overall low setback viscosity of the obtained mixtures formulated with a thermally inhibited starch according to the present invention. Indeed, both t190 starch and t180 starch bring to low setback viscosity; in particular, a surprisingly low value for t190 starch is detected (347 (UB) for t190 starch compared with 465 (UB) for waxy corn starch).

A low setback viscosity indicates a lower retrogradation tendency and less syneresis is likely to take place, therefore starches obtained from a process according to the present invention allow to arrive at a final product which has a better quality and shelf-life.

The invention claimed is:

1. A process for continuous modification of starch, comprising the steps of:
    a) mixing starch in powder form having a moisture content between 9% wt and 25% wt with an alkaline water solution to obtain a wet powder;
    b) feeding a continuous flow of said wet powder into a continuous dryer together with a continuous flow of hot air, said flow of hot air having a temperature between 100° C. and 160° C. to obtain a continuous flow of dried powder;
    c) discharging said continuous flow of dried powder from said continuous drier, said dried powder having a moisture content between 2% wt and 4% wt;
    d) providing a turbo-reactor comprising a cylindrical tubular body having at least one inlet opening for the introduction of said continuous flow of dried powder and at least one discharge opening, a heating jacket for bringing the temperature of said cylindrical tubular body to a predetermined temperature and a rotor, disposed in the cylindrical tubular body and comprising a shaft provided with elements projecting radially from it;
    e) supplying said continuous flow of said dried powder into said turbo-reactor, in which the inner wall of said turbo-reactor is maintained at a temperature between 150° C. and 250° C. by means of said heating jacket and the rotor is rotated at a speed greater than or equal to 800 rpm, so that said dried powder is continuously centrifuged and advanced inside said turbo-reactor through the action of said rotor for a time between 4 minutes and 7 minutes and converted into a thermally inhibited starch;
    f) discharging said thermally inhibited starch from said turbo-reactor.

2. The process according to claim 1, wherein said step e) is carried out maintaining said dried powder at pH between 8.5 and 9.5.

3. The process according to claim 1, wherein said step a) is carried out by means of a continuous mixer.

4. The process according to claim 1, wherein in said step b) said continuous flow of said wet powder is continuously fed to a turbo-dryer comprising a cylindrical tubular body having at least one inlet opening, for the introduction of said wet powder, one air-inlet opening for the introduction of said continuous flow of hot air and at least one discharge opening for discharging said continuous flow of dried powder, a heating jacket for bringing the temperature of said cylindrical tubular body to a predetermined temperature and a rotor, disposed in said cylindrical tubular body and comprising a shaft provided with elements projecting radially from it, being the inner wall of the turbo-dryer maintained at a temperature between 150° C. and 180° C. by means of said heating jacket and the rotor being rotated at a speed greater than or equal to 800 rpm, said continuous flow of wet powder being continuously centrifuged and advanced inside said turbo-dryer through the action of said rotor.

5. The process according to claim 4, wherein step b) is carried out for a time between 15 seconds and 120 seconds.

6. The process according to claim 4, comprising the further steps of:
   g) supplying a continuous flow of said thermally inhibited starch into a further turbo-reactor which comprises a cylindrical tubular body having at least one inlet opening for the introduction of said thermally inhibited starch and at least one discharge opening, a heating jacket for bringing the temperature of said cylindrical tubular body to a predetermined temperature and a rotor, disposed in the cylindrical tubular body and comprising a shaft provided with elements projecting radially from it, in which the inner wall of the further turbo-reactor is maintained at a temperature between 150° C. and 250° C. by means of said heating jacket and the rotor is rotated at a speed greater than or equal to 800 rpm, said thermally inhibited starch being continuously centrifuged and advanced inside said further turbo-reactor through the action of said rotor, in order to further enhance starch thermal inhibition;
   h) discharging said thermally inhibited starch from said further turbo-reactor.

7. The process according to claim 6, wherein said step g) is carried out for a time between 4 minutes and 7 minutes.

8. The process according to claim 1, wherein said flow of alkaline water solution comprises a base, said base having a pKb between 1 and 13.

9. The process according to claim 8, wherein said base is a food grade additive, said base being selected from an element of the group consisting of dibasic oxalate metal salt, dibasic tartrate metal salt, tribasic citrate metal salt, tribasic phosphate metal salt, monobasic carbonate metal salt, dibasic carbonate metal salt, glycinate metal salt, calcium hydroxide and any combination thereof.

* * * * *